United States Patent
Zank

Patent Number: 5,508,238
Date of Patent: Apr. 16, 1996

[54] MONOLITHIC CERAMIC BODIES USING MODIFIED HYDROGEN SILSESQUIOXANE RESIN

[75] Inventor: Gregg A. Zank, Midland, Mich.

[73] Assignee: Dow Corning Corporation, Midland, Mich.

[21] Appl. No.: 439,165

[22] Filed: May 11, 1995

[51] Int. Cl.$^6$ .................................................... C04B 35/56
[52] U.S. Cl. .................... 501/87; 264/331.11; 501/133
[58] Field of Search .......................... 501/88, 133, 87; 264/65, 331.11, 331.17

[56] References Cited

U.S. PATENT DOCUMENTS

| | | | |
|---|---|---|---|
| 3,615,272 | 12/1971 | Collins et al. | 423/325 |
| 4,756,977 | 7/1988 | Haluska et al. | 428/704 |
| 4,847,162 | 7/1989 | Haluska et al. | 427/404 |
| 4,849,296 | 7/1989 | Haluska et al. | 427/404 |
| 4,888,376 | 12/1989 | Atwell et al. | 524/401 |
| 5,310,583 | 5/1994 | Eckstein et al. | 427/578 |
| 5,336,532 | 8/1994 | Haluska et al. | 427/515 |
| 5,370,904 | 12/1994 | Mine et al. | 427/387 |
| 5,372,842 | 12/1994 | Mine et al. | 427/387 |
| 5,436,029 | 7/1995 | Ballance et al. | 427/387 |

*Primary Examiner*—Anthony Green
*Attorney, Agent, or Firm*—Roger E. Gobrogge

[57] ABSTRACT

Disclosed are novel monolithic ceramic bodies of the structure $SiO_yC_z$, wherein $y=1.2$ to 1.6 and $z=0.2$–$0.6$. These ceramic bodies are derived from a modified hydrogen silsesquioxane resin.

11 Claims, No Drawings

MONOLITHIC CERAMIC BODIES USING MODIFIED HYDROGEN SILSESQUIOXANE RESIN

BACKGROUND OF THE INVENTION

The present invention relates to novel monolithic ceramic materials using modified hydrogen silsesquioxane resin. These materials can be formed into complex shapes which have good oxidation resistance at high temperatures and high strength.

The formation of ceramics using siloxane polymers is known in the art. For instance, U.S. Pat. No. 4,888,376 describes the use of an organopolysiloxane as a binder for silicon carbide powder. The organopolysiloxanes and the resultant ceramics described therein, however, are different than modified hydrogen silsesquioxane resin and its ceramic in that the chars of the reference are carbon rich compared to chars of the present invention which have the generic formula $SiO_yC_z$, wherein $y=1.2$ to $1.6$ and $z=0.2$–$0.6$.

Similarly, Leung et al. teach carbon-containing black glass monoliths derived from organopolysiloxanes. The organopolysiloxanes taught therein, however, are limited to cyclosiloxanes and, thus, do not encompass the modified hydrogen silsesquioxane resin claimed herein.

Hydrogen silsesquioxane resin is also known in the art. For instance, Collins et al. in U.S. Pat. No. 3,615,272 describe the production of soluble hydrogen silsesquioxane resin by the hydrolysis and condensation of a silane in a sulfuric acid medium. Similarly, Haluska et al. U.S. Pat. No. 4,756,977 teach the use of hydrogen silsesquioxane resin to form protective ceramic coatings on electronic devices. These references, however, do not describe the modification of the resin nor its use in forming monolithic bodies.

The present inventors have unexpectedly found that modified hydrogen silsesquioxane resin can be used to prepare ceramics with excellent properties.

SUMMARY OF THE INVENTION

The present invention relates to a method of making a monolithic ceramic body. The method comprises forming a mixture comprising modified hydrogen silsesquioxane resin and, optionally, ceramic fillers into a preceramic body. The preceramic body is then heated to a temperature of at least about 1000° C. in an inert atmosphere for a time sufficient to convert the preceramic body into a ceramic.

DETAILED DESCRIPTION OF THE INVENTION

The present invention is based on the discovery that novel monolithic ceramic bodies can be formed from modified hydrogen silsesquioxane. This was particularly unexpected since hydrogen silsesquioxane resin does not have carbon in its repeating units and high carbon levels were thought to be essential in the fabrication of desirable ceramics. The present inventor has now found that monolithic bodies derived from this resin have excellent properties even at elevated temperatures in air.

As used in the present invention, the expression "monolith" is used to describe ceramic materials containing a single crystalline species. The expression "body" is used to described a formed structure. In a preferred embodiment, the "body" is not a coating.

The preceramic material used to form the monolithic body is modified hydrogen silsesquioxane resin (H-resin). The hydrogen silsesquioxane resin is formed by the hydrolysis or partial hydrolysis of $HSiX_3$, wherein X is a hydrolyzable substituent. Exemplary hydrolyzable substituents include halogens such as chlorine, fluorine, bromine and the like and hydrocarbonoxy groups such as alkoxy, acyloxy and the like. The resultant resins have the formula $HSi(OH)_x(X)_yO_{z/2}$, in which each X is a hydrolyzable substituent as defined above, $x=0$–$2$, $y=0$–$2$, $z=1$–$3$, $x+y+z=3$. As such, these resins may be fully condensed $(HSiO_{3/2})_n$ or they may be only partially hydrolyzed (i.e., containing some Si—X) and/or partially condensed (i.e., containing some Si—OH). Although not represented by this structure, these resins may contain a small number (eg., less than about 10%) of silicon atoms which have either 0 or 2 hydrogen atoms attached thereto due to various factors involved in their formation or handling.

Methods for making hydrogen silsesquioxane resin are also known in the art. For example, it is known to hydrolyze an alkoxy or acyloxy silane with water in an acidic, alcoholic hydrolysis medium. Similarly, Collins et al. in U.S. Pat. No. 3,615,272, which is incorporated herein by reference, teach the production of a nearly fully condensed H-resin (which may contain up to 100–300 ppm silanol) by a process comprising hydrolyzing trichlorosilane in a benzenesulfonic acid hydrate hydrolysis medium and then washing the resultant resin with water or aqueous sulfuric acid. Additionally, Bank et al. in U.S. Pat. No. 5,010,159, which is hereby incorporated by reference, teach an alternative method comprising hydrolyzing hydridosilanes in an arylsulfonic acid hydrate hydrolysis medium to form a resin which is then contacted with a neutralizing agent.

The hydrogen silsesquioxane resin used in this invention is generally modified to render it useful in the formation of ceramic materials. Without modification, hydrogen silsesquioxane resin has a broad molecular weight range which can lead to a wide variability in the physical properties of the resin which, in turn, lead to variability in processing. Additionally, the broad molecular weight range of the resin can lead to decreased ceramic yields due to vaporization of low molecular weight species.

The present inventor, therefore, has discovered a method for tailoring the molecular weight distribution of the resin to eliminate these problems. This tailoring affords one the ability to make resins having, for instance, the appropriate theological properties needed for ceramic fabrication. Similarly, the modification renders the resin curable under moderate conditions such as mild heat, radiation, curing catalysts or curing agents. This curability is essential to the invention to increase the ceramic yield and to inhibit cracking.

Generally, the H–resin modification is performed by endcapping the resin with a material containing Si–C and Si–H bonds. Examples of such materials are those generally encompassed by the structure $(R_1R_2R_3Si)_2O$, wherein $R_1$, $R_2$, and $R_3$ are independently selected from hydrogen, alkyls such as methyl, ethyl, propyl and the like or aryls such as phenyl. Specific compounds include tetramethyldisiloxane, hexamethyldisiloxane and the like.

The endcapping and molecular weight control is generally accomplished by redistribution under acid/water conditions in the presence of the endcapping agent. The ratio of the H-resin to endcapping agent in this reaction can be used to tailor the molecular weight of the resin. Generally, the molar ratio of H-resin to endcapping agent is in the range of about 10:1 to about 1:10.

The expression "modified hydrogen silsesquioxane resin", therefore, is used to describe these endcapped resins which are curable and have tailored molecular weights. These resins generally have the structure $(HSiO_{1.5})_x(R_1R_2R_3SiO_{0.5})_y$, wherein $R_1$, $R_2$, and $R_3$ are independently selected from hydrogen, alkyls and aryls, x is 0.25 to 0.99, y is 0.01 to 0.75 and x+y=1.0. Preferably, $R_1$, $R_2$, and $R_3$ are independently selected from hydrogen and methyl, x is 0.5 to 0.99, y is 0.01 to 0.5 and x+y=1.0. Preferably, the number average molecular weight for (Mn) these materials are in the range of about 500 to about 2500.

When the resultant resin is pyrolyzed, the char composition has a stoichiometry of approximately $SiO_yC_z$, wherein y=1.2 to 1.6 and z=0.2 to 0.6. As is readily recognized, this material has less than a stoichiometric amount of carbon.

The compositions of the invention may also include silicon carbide powders. Many of these materials are commercially available and well known in the art. Both alpha-SiC and beta-SiC powders, as well as mixtures, can be used. Generally, SiC powders with an average particle size of less than about ten micrometers are preferred. Powders with an average particle size of less than five micrometers are more preferred and those with an average particle size less than 1 micrometer are even more preferred. If used, the amount of silicon carbide powder is generally in the range of about 10 to about 90 weight percent based on the weight of the modified H-resin.

The compositions of the invention may also include sintering agents. Generally, the amount of sintering agent should be in the range of about 0.1 to 3.0 weight percent. Suitable sintering agents include iron, $Fe_3C$, magnesium, $MgC_3$, lithium, $Li_2C_2$, beryllium, $Be_2C$, boron, boron-containing compounds (eg., boron carbide, lithium borohydride, trivinylboron, triphenylboron, silicon hexaboride, $H_3BO_3$, $B_2O_3$, and the like), aluminum, aluminum-containing compounds (aluminum oxide, aluminum nitride, aluminum diboride, and the like), and metal oxides such as thorium oxide, yttrium oxide, lanthanum oxide, and cerium oxide. Many of these metal-containing sintering aids are described in Negita, "Effective Sintering Aids for Silicon Carbide Ceramics: Reactivities of Silicon Carbide with Various Additives," 69 J. Am. Ceram. Soc. C-308 (1986). Mixtures of sintering aids may also be used.

The compositions of this invention may also contain curing agents which are used to crosslink the H–resin prior to sintering. The green bodies produced thereby generally have higher strengths than the uncured articles and, thus, can better withstand any handling or machining processes prior to sintering. These curing agents may be activated by heating the green body containing the curing agent to temperatures in the range of 50°–300° C. (i.e., the activation of a free radical precursor) or they may be crosslinked at room temperature.

Curing agents are well known in the art. Examples include free radical precursors such as organic peroxides (dibenzoyl peroxide, bis-p-chlorobenzol peroxide, bis-2,4-dichlorobenzol peroxide, di-butyl peroxide, dicumyl peroxide, t-butyl perbenzoate, 2,5-bis(t-butylperoxy) -2,3-dimethylhexane and t-butyl peracetate); and platinum-containing curing agents such as platinum metal, $H_2PtCl_6$, and $((C_4H_9)_3P)_2PtCl_2$. Other conventional curing agents known in the art may also be used. The curing agent is present in an effective amount, i.e. an amount sufficient to induce crosslinking in the H–resin. Normally, however, the peroxide curing agent will be present at about 0.1 to 5.0 weight percent based on the weight of the compound to be cured with the preferred amount being about 2.0 weight percent. When platinum-containing curing agents are used, the amount will normally be such that platinum is present at about 1 to 1000 ppm based on the weight of the compound to be cured with the preferred amount being about 50 to 150 ppm platinum.

Examples of crosslinking agents include, for example, polyfunctional organosilicon compounds such as silanes, silazanes or siloxanes. The preferred crosslinking agents are organosilicon compounds with Si—H or Si—Vi functional bonds.

The addition of other processing aids such as lubricants, deflocculants and dispersants is also within the scope of this invention. Examples of such compounds include stearic acid, mineral oil, paraffin, calcium stearate, aluminum stearate, succinic acid, succinimide, succinic anhydride or various commercial products such as Oloa 1200™.

The desired amounts of the various components, if used, are combined in a manner which assures a uniform and intimate mixture so that areas of varying density throughout the sintered product are avoided. These mixtures can be produced by using conventional blending techniques such as grinding the various powders in either the dry or wet state or ultrasonic dispersion. Generally preferred is wet grinding where the various powders are mixed and ground with organic solvents and the solvent thereafter removed. Other mixing and grinding methods will be apparent to those skilled in the art.

The uniform and intimate mixture may then be formed into green bodies of the desired shape. The green bodies may be formed by conventional techniques known in the art. Such methods include pressure molding, uniaxial pressing, isopressing, extrusion, transfer molding, injection molding, and the like. The present invention is particularly advantageous in this respect since the composition of the preceramic mixture can easily be changed to accommodate the use of multiple molding techniques without affecting the quality of the sintered product.

The above formed body is preferably cured prior to its final shaping. Curing procedures are well known in the art. Generally, such curing can be carried out by heating the article to a temperature in the range of about 50° to 450° C., preferably in an inert atmosphere such as argon or nitrogen.

Because the preceramic mixture includes H-resin, green bodies formed by the above techniques are generally strong enough to be handled or further shaped by methods such as machining, milling etc. This not only alleviates the problems associated with handling fragile objects, but it allows for the production of more complex shapes through flexibility in product design.

Once the final shape has been obtained, the article is sintered in an inert atmosphere and/or under vacuum to a temperature of 1000° C. or more. The preferred sintering temperature is about 1200° to 2200° C.

The compositions of this invention may be sintered either under pressure or by using a pressureless process. Since the sintering process employing pressure will generally produce ceramic articles with higher density, such a method would be preferred if maximum density were desired. Generally, however, the pressureless sintering process is preferred because of the simplified operations involved.

Inert atmospheres are used during pyrolysis to prevent oxygen incorporation into the ceramic. The sintering process as well as the density of the sintered product are thereby enhanced. For purposes of this invention, an inert atmosphere is meant to include an inert gas, vacuum or both. If an inert gas is used it may be, for example, argon, helium or nitrogen. If a vacuum is used it may be, for example, in the range of 0.1–200 torr, preferably 0.1–0.3 torr. Exemplary of a combined process might be firing the composition in argon up to 1150° C., firing from 1150 to 1575° C. in a vacuum and firing from 1575° to 2070° C. under argon.

Sintering may be performed in any conventional high temperature furnace equipped with a means to control the furnace atmosphere. Such furnaces are well known in the art and many are commercially available.

The temperature schedule for sintering depends on both the volume of parts to be fired and the composition of the mixture. For smaller objects the temperature may be elevated relatively rapidly. For larger objects or those with large concentrations of the H-resin, however, more extended programs are needed to create uniform ceramic bodies.

The resultant monolithic bodies are oxidation resistant and have high strengths. They can be used, for example, as wear parts, as filters or as catalyst supports.

The following non-limiting examples are provided so that one skilled in the art might better understand the invention.

Throughout this specification "Me" represents a methyl group, "Ph" represents a phenyl group and "Vi" represents a vinyl group.

All reaction were carried out in an argon atmosphere in laboratory glassware. Hydrogen silsesquioxane resin was obtained from Dow Corning Corporation and was produced by the method of U.S. Pat. No. 3,615,272. $(Me_2HSi)_2O$ was purchased from Huls Systems. Trifluromethaneacetic acid was purchased from Aldrich Chemical.

All NMR spectra were recorded on a Varian VXR200T spectrometer. Solution spectra were recorded in $CDCl_3$ in a 5 mm switchable probe ($^1H$, 399.95 MHz) or a 16 mm Si-free probe ($^{29}Si$, 79.46 MHz) and referenced to internal $CDCl_3$(7.25 ppm, $^1$ H) or TMS (0 ppm). The integrals were normalized and calculated relative to the siloxane species. $Cr(acac)_3$ (0.02 M) was added for the $^{29}Si$ spectra to ensure quantitative acquisition.

Gel permeation chromatography (GPC) data were obtained on a Waters GPC equipped with a model 600E systems controller, a model 490 UI and model 410 Differential Defractometer detectors interfaced to a Digital Professional 380 computer employing Waters 'Expert' software; all values are relative to polystyrene standards.

Carbon, hydrogen and nitrogen analysis were done on a Control Equipment Corporation 240-XA Elemental Analyzer. Oxygen analyses were done on a Leco Oxygen Analyzer equipped with an Oxygen Determinator 316 (Model 783700) and an Electrode Furnace EF100. Silicon was determined by a fusion technique which consisted of converting the silicon material to soluble forms of silicon and analyzing the solute for total silicon by atomic absorption spectrometry.

All furnace firings were done in a Lindberg tube furnace, Model 54233 equipped with a Eurotherm controller.

EXAMPLE 1

Preparation of $(HSiO_{1.5})_{0.90}(Me_2HSiO_{0.5})_{0.10}$
Polymer Synthesis

A toluene solution (approximately 20% by weight solids) of hydrogen silsesquioxane resin, 265 g (53 g of hydrogen silsesquioxane resin), was placed in a 500 mL three necked round bottom flask fitted with an overhead stirrer, thermometer and condenser under argon. To this solution was added 67 g of $(Me_2HSiO)_2$ (one equivalent of $(Me_2HSiO)_{0.5}$, 1 g of trifluoroacetic acid and 1 g of water. The resulting solution was refluxed 24 h. The reaction was cooled and 1 g of $CaCO_3$ and 5 g of water were added to neutralize the acid. The reaction was fitted with a Dean Stark trap and the water was removed by azetroping dry over an 8 h period. The reaction was cooled and 5 g of $Me_2HSiCl$ added and allowed to stir overnight. The polymer was isolated by filtration through a 1.0 micrometer membrane and removing the solvent in vacuo at 50° C. The polymer was characterized by GPC molecular weight analysis: Mw=5,809; Mn=1,222 and z=4.75 and $^1H$ NMR which showed a broad singlet 4.8 ppm (1 H, $Me_2HSiO_{0.5}$), a broad multiplet at 4.4 ppm (9 H, $HSiO_{1.5}$) and a broad singlet at 0.3 ppm (6.2 H, $(Me)_2HSiO_{0.5}$).

Crosslinking and Conversion to a Ceramic

A sample of the above resin, 4.0 g, was blended with 1.0 g of vinyl functional si! oxane fluid of the formula $(MeSiO_{1.5})_{0.10}(MeViSiO)_{0.90}$ and 0.05 g of dicumuyl peroxide. The above mixture was heated to 150° C. under Ar to afford a brittle solid in 99% yield. An aliquot of this cured material was then weighed in an alumina boat and transferred to a Lindberg tube furnace. The furnace was continuously purged with argon and the sample heated to 1200° C. at 10°C./minute and held at temperature for 1 hour before cooling back to ambient temperatures. The ceramic yield was 85.3% and the ceramic analysis was C:9.3; Si:43.9; 0:40.95.

Oxidation of the Ceramic

The above ceramic was ground in a synthetic sapphire mortar and pestle to a fine powder. An aliquot of this powder was then weighed in an alumina boat and transferred to a Lindberg tube furnace. The sample was heated to 1000° C. at 10° C./minute in flowing air and held at temperature for 10 hours before cooling back to ambient temperatures. The % weight change was found to be 0.5% and the material had the following ceramic analysis was C:8.3; Si:37.5; 0:41.95.

EXAMPLE 2

Preparation of $(HSiO_{1.5})_{0.65}(Me_2HSiO_{0.5})_{0.35}$
Polymer Synthesis

A toluene solution (approximately 20% by weight solids) of hydrogen silsesquioxane resin, 650 g (130 g of hydrogen silsesquioxane resin), was placed in a 1 L three necked round bottom flask fitted with an overhead stirrer, thermometer and condenser under argon. To this solution was added 160 g of $(Me_2HSiO)_2$ (2.38 equivalents of $(Me_2HSiO)_{0.5}$, 2.5 g of trifluoroacetic acid and 2.5 g of water. The resulting solution was refluxed 48 h. The reaction was cooled and 2.5 g of $CaCO_3$ and 10 g of water were added to neutralize the acid. The reaction was fitted with a Dean Stark trap and the water was removed by azetroping dry over an 24 h period. The polymer was isolated by filtration through a 1.0 micrometer membrane and removing the solvent in vacuo at 50° C. The yield was 222 g. The polymer was characterized by GPC molecular weight analysis: Mw=4,269; Mn=1,407 and z=3.03 and $^1H$ NMR which showed a broad singlet 4.7 ppm (3.5 H, $Me_2HSiO_{0.5}$), a broad multipier at 4.4 ppm (6.5 H, $HSiO_{1.5}$) and a broad singlet at 0.2 ppm (12.5 H, $(Me)_2HSiO_{0.5}$) and $^{29}Si$ NMR which showed a broad doublet at −4.0 ppm (1 Si, $(Me)_2HSiO_{0.5}$ and a broad doublet at −85 ppm (1.68 Si, $HSiO_{1.5}$.

Crosslinking and Conversion to a Ceramic

A sample of the above resin, 4.0 g, was blended with 1.0 g of vinyl functional siloxane fluid of the formula $(MeSiO_{0.5})_{0.10}(MeViSiO)_{0.90}$ and 0.05 g of dicumuyl peroxide. The above mixture was heated to 150° C. under Ar to afford a brittle solid in 99% yield. An aliquot of this cured material was then weighed in an alumina boat and transferred to a Lindberg tube furnace. The furnace was continuously purged with argon and the sample heated to 1200° C. at 10° C./minute and held at temperature for 1 hour before cooling back to ambient temperatures. The ceramic yield was 71.2% and the ceramic analysis was C:15.1; Si:45.5; 0:33.4.

Oxidation of the Ceramic

The above ceramic was ground in a synthetic sapphire mortar and pestle to a fine powder. An aliquot of this powder was then weighed in an alumina boat and transferred to a Lindberg tube furnace. The sample was heated to 1000° C. at 10° C./minute in flowing air and held at temperature for 10 hours before cooling back to ambient temperatures. The % weight change was found to be +1.1% and the material had the following ceramic analysis C:11.9; Si:42.5; 0:37.5.

EXAMPLE 3

Preparation of $(HSiO_{1.5})_{0.92}(Me_2HSiO_{0.5})_{0.08}$
Polymer Synthesis

A toluene solution (approximately 40% by weight solids) of hydrogen silsesquioxane resin (Mw=9,667; Mn=1200; z=8.05), 358 g (143 g of hydrogen silsesquioxane resin), was placed in a 1 L three necked round bottom flask fitted with an overhead stirrer, thermometer and condenser under argon. To this solution was added 20.1 g of $(Me_2HSiO)_2$ (0.3 equivalents of $(Me_2HSiO)_{0.5}$, 2.0 g of trifluoroacetic acid and 2.0 g of water. The resulting solution was refluxed 40 h. The reaction was cooled and 2.0 g of $CaCO_3$ and 10 g of water were added to neutralize the acid. The reaction was fitted with a Dean Stark trap and the water was removed by azetroping dry over an 24 h period. The polymer was isolated by filtration through a 1.0 micrometer membrane and removing the solvent in vacuo at 50° C. The yield was 160 g. The polymer has a Tg of 29° C. and was characterized by GPC molecular weight analysis: Mw=29,010; Mn=1,653 and z=17.74 and $^{29}Si$ NMR which showed a broad doublet at −3.0 ppm (1 Si, $(Me)_2HSiO_{0.5}$ and a broad doublet at −85 ppm (11.12 Si, $HSiO_{1.5}$). AS a test of the stability of this polymer the GPC molecular weight was measured twice a week for 3 weeks after which time it was apparent that the molecular weight of the polymer was drifting upwards and the polymer was becoming less soluble and leading to gelation.

Crosslinking and Conversion to a Ceramic

A sample of the above resin, 4.0 g, was blended with 1.0 g of vinyl functional siloxane fluid of the formula $(MeSiO_{1.5})_{0.10}(MeViSiO)_{0.90}$ and 0.05 g of dicumuyl peroxide. The above mixture was heated to 150° C. under Ar to afford a brittle solid in 99% yield. An aliquot of this cured material was then weighed in an alumina boat and transferred to a Lindberg tube furnace. The furnace was continuously purged with argon and the sample heated to 1200° C. at 10° C./minute and held at temperature for 1 hour before cooling back to ambient temperatures. The ceramic yield was 88.7% and the ceramic analysis was C:6.93; Si:46.3; 0:42.5.

Oxidation of the Ceramic

The above ceramic was ground in a synthetic sapphire mortar and pestle to a fine powder. An aliquot of this powder was then weighed in an alumina boat and transferred to a Lindberg tube furnace. The sample was heated to 1000° C. at 10° C./minute in flowing air and held at temperature for 10 hours before cooling back to ambient temperatures. The % weight change was found to be +1.1% and the material had the following ceramic analysis C:5.6; Si:44.2; 0:45.2.

EXAMPLE 4

Preparation of $(HSiO_{1.5})_{0.92}(ME_2HSiO_{0.5})_{0.08}$
Polymer Synthesis

A toluene solution (approximately 18% by weight solids) of hydrogen silsesquioxane resin (Mw=9,667; Mn=1200; z=8.05), 796 g (143 g of hydrogen silsesquioxane resin), was placed in a 1 L three necked round bottom flask fitted with an overhead stirrer, thermometer and condenser under argon. To this solution was added 20.1 g of $(Me_2HSiO)_2$(0.3 equivalents of $(Me_2HSiO)_{0.5}$, 2.0 g of trifluoroacetic acid and 2.0 q of water. The resulting solution was refluxed 40 h. The reaction was cooled and 2.0 g of $CaCO_3$ and 10 g of water were added to neutralize the acid. The reaction was fitted with a Dean Stark trap and the water was removed by azetroping dry over an 24 h period. The polymer was isolated by filtration through a 1.0 micrometer membrane and removing the solvent in vacuo at 50° C. The yield was 179 g. The polymer has a Tg of −39° C. and was characterized by GPC molecular weight analysis: Mw=9,194; Mn=1,338 and z=6.87 and $^{29}Si$ NMR which showed a broad doublet at −3.0 ppm (1 Si, $(Me)_2HSiO_{0.5}$ and a broad doublet at −85 ppm (12.175 Si, $HSiO_{1.5}$).

As a test of the stability of this polymer the GPC molecular weight was measured twice a week for 6 weeks after which time it was apparent that the molecular weight of the polymer was not changing at all, indicating that the material was not gelling.

Crosslinking and Conversion to a Ceramic

A sample of the above resin, 4.0 g, was blended with 1.0 g of vinyl functional siloxane fluid of the formula $(MeSiO_{1.5})_{0.10}(MeViSiO)_{0.90}$ and 0.05 g of dicumuyl peroxide. The above mixture was heated to 150° C. under Ar to afford a brittle solid in 99% yield. An aliquot of this cured material was then weighed in an alumina boat and transferred to a Lindberg tube furnace. The furnace was continuously purged with argon and the sample heated to 1200° C. at 10° C./minute and held at temperature for 1 hour before cooling back to ambient temperatures. The ceramic yield was 89.6% and the ceramic analysis was C:10.17; Si:48.7; 0:35.8.

Oxidation of the Ceramic

The above ceramic was ground in a synthetic sapphire mortar and pestle to a fine powder. An aliquot of this powder was then weighed in an alumina boat and transferred to a Lindberg tube furnace. The sample was heated to 1000° C. at 10° C./minute in flowing air and held at temperature for 10 hours before cooling back to ambient temperatures. The % weight change was found to be +0.8 % and the material had the following ceramic analysis C:9.08; Si:42.3; 0:40.3.

EXAMPLE 5

Preparation of $(HSiO_{1.5})_{0.92}(Me_2HSiO_{0.5})_{0.08}$
Polymer Synthesis

A toluene solution (approximately 18% by weight solids) of hydrogen silsesquioxane resin 796 g (143 g of hydrogen silsesquioxane resin), was placed in a 1 L three necked round bottom flask fitted with an overhead stirrer, thermometer and condenser under argon. To this solution was added 20.1 g of $(Me_2HSiO)_2$ (0.3 equivalents of $(Me_2HSiO)_{0.5}$, 2.0 g of trifluoroacetic acid and 2.0 g of water. The resulting solution was refluxed 40 h. The reaction was cooled and 2.0 g of $CaCO_3$ and 10 g of water were added to neutralize the acid. The reaction was fitted with a Dean Stark trap and the water was removed by azetroping dry over an 24 h period. The polymer was isolated by filtration through a 1.0 micrometer membrane and removing the solvent in vacuo at 50° C. The yield was 160 g. The polymer has a Tg of 29° C. and was characterized by GPC molecular weight analysis: Mw=29,010 and Mn=1,635 and $^{29}$Si NMR which showed a broad doublet at −3.0 ppm (1 Si, (Me)$_s$HSiO$_{0.5}$ and a broad doublet at −85 ppm (12.175 Si, HSiO$_{1.5}$).

Crosslinking and Conversion to a Ceramic

A sample of the above resin, 4.0 g, was blended with 1.0 g of vinyl functional siloxane fluid of the formula (MeSiO$_{1.5}$)$_{0.10}$ (MeViSiO)$_{0.90}$ and 0.05 g of dicumuyl peroxide. The above mixture was heated to 150° C. under Ar to afford a brittle solid in 99% yield. An aliquot of this cured material was then weighed in an alumina boat and transferred to a Lindberg tube furnace. The furnace was continuously purged with argon and the sample heated to 1200° C. at 10° C./minute and held at temperature for 1 hour before cooling back no ambient temperatures. The ceramic yield was 89% and the ceramic analysis was C:6.93; Si:46.3; 0:42.5.

Oxidation of the Ceramic

The above ceramic was ground in a synthetic sapphire mortar and pestle to a fine powder. An aliquot of this powder was then weighed in an alumina boat and transferred to a Lindberg tube furnace. The sample was heated to 1000° C. at 10° C./minute in flowing air and held at temperature for 10 hours before cooling back to ambient temperatures. The % weight change was found to be +1.1% and the material had the following ceramic analysis C:5.57; Si:44.2; 0:45.2.

EXAMPLE 6

Preparation of (HSiO$_{1.5}$)$_{0.63}$(Me$_2$HSiO$_{0.5}$)$_{0.37}$

Polymer Synthesis

A toluene solution (approximately 18% by weight solids) of hydrogen silsesquioxane resin 650 g (117 g of hydrogen silsesquioxane resin), was placed in a 1 L three necked round bottom flask fitted with an overhead stirrer, thermometer and condenser under argon. To this solution was added 160 g of (Me$_2$HSiO)$_2$ (2.4 equivalents of (Me$_2$HSiO)$_{0.5}$, 2.0 g of trifluoroacetic acid and 2.0 g of water. The resulting solution was refluxed 48 h. The reaction was cooled and 2.0 g of CaCO$_3$ and 10 g of water were added to neutralize the acid. The reaction was fitted with a Dean Stark trap and the water was removed by azetroping dry over an 24 h period. The polymer was isolated by filtration through a 1.0 micrometer membrane and removing the solvent in vacuo at 50° C. The yield was 70 g. The polymer has a Tg of −22° C. and was characterized by GPC molecular weight analysis: Mw=4,269 and Mn=1,407 and $^{29}$Si NMR which showed a broad doublet at −4.0 ppm ((Me)$_2$HSiO$_{0.5}$) and a broad doublet at −85 ppm (HSiO$_{1.5}$).

Crosslinking and Conversion to a Ceramic

A sample of the above resin, 4.0 g, was blended with 1.0 g of vinyl functional siloxane fluid of the formula (MeSiO$_{1.5}$)$_{0.10}$(MeViSiO)$_{0.90}$ and 0.05 g of dicumuyl peroxide. The above mixture was heated to 150° C. under Ar to afford a brittle solid in 99% yield. An aliquot of this cured material was then weighed in an alumina boat and transferred to a Lindberg tube furnace. The furnace was continuously purged with argon and the sample heated to 1200° C. at 10° C./minute and held at temperature for 1 hour before cooling back to ambient temperatures. The ceramic yield was 71.2% and the ceramic analysis was C:15.1; Si:45.5; 0:33.4.

Oxidation of the Ceramic

The above ceramic was ground in a synthetic sapphire mortar and pestle to a fine powder. An aliquot of this powder was then weighed in an alumina boat and transferred to a Lindberg tube furnace. The sample was heated to 1000° C. at 10° C./minute in flowing air and held at temperature for 10 hours before cooling back to ambient temperatures. The % weight change was found to be +1.1% and the material had the following ceramic analysis C:11.9; Si:42.5; 0:37.5.

That which is claimed is:

1. A method of making a monolithic ceramic body comprising:

forming a mixture comprising modified hydrogen silsesquioxane resin into a preceramic body; and heating the preceramic body to a temperature of at least about 1000° C. in an inert atmosphere for a time sufficient to convert the preceramic body into a ceramic.

2. The method of claim 1 wherein the modified hydrogen silsesquioxane resin has the structure (HSiO$_{1.5}$)$_x$(R$_1$R$_2$R$_3$SiO$_{0.5}$)$_y$, wherein R$_1$, R$_2$, and R$_3$ are independently selected from hydrogen, alkyls and aryls, x is 0.25 to 0.99, y is 0.01 to 0.75 and x+y=1.0.

3. The method of claim 2 wherein R$_1$, R$_2$, and R$_3$ are independently selected from hydrogen and methyl, x is 0.5 to 0.99, y is 0.01 to 0.5 and x+y=1.0.

4. The method of claim 1 wherein the modified hydrogen silsesquioxane resin has the structure (HSiO$_{1.5}$)$_x$(Me$_2$HSiO$_{0.5}$)$_y$, wherein x is 0.5 to 0.99, y is 0.01 to 0.5 and x+y=1.0.

5. The method of claim 1 wherein the modified hydrogen silsesquioxane resin has a number average molecular weight in the range of between about 500 and about 2500.

6. The method of claim 1 wherein the mixture comprising modified hydrogen silsesquioxane resin also contains silicon carbide powder in an amount of about 10 to 90 weight percent based on the weight of modified hydrogen silsesquioxane resin.

7. The method of claim 1 wherein the mixture comprising modified hydrogen silsesquioxane resin also contains a sintering aid in an amount of about 0.1 to 3 weight percent.

8. The method of claim 1 wherein the mixture comprising modified hydrogen silsesquioxane resin also contains a material which can cure the modified hydrogen silsesquioxane resin in an amount sufficient to induce crosslinking of the modified hydrogen silsesquioxane resin.

9. The method of claim 8 wherein the mixture containing the modified hydrogen silsesquioxane resin and material which can cure the modified hydrogen silsesquioxane resin is cured prior to ceramification.

10. The method of claim 1 wherein the preceramic body is heated to a temperature between about 1200° C. and about 2200° C. in an inert atmosphere for between about 1 and about 6 hours.

11. A monolithic ceramic body comprising silicon, carbon and oxygen having a stoichiometry of SiO$_y$C$_z$, wherein y=1.2 to 1.6 and z=0.21–0.6.

* * * * *